(12) United States Patent
Ludwig

(10) Patent No.: US 8,780,757 B2
(45) Date of Patent: *Jul. 15, 2014

(54) NETWORK COMMUNICATIONS BANDWIDTH MANAGER CONTROL SYSTEM PROVIDING FOR ASSOCIATED COMMUNICATIONS PROCESSING RESOURCES

(75) Inventor: Lester Ludwig, Redwood Shores, CA (US)

(73) Assignee: Avistar Communications Corporation, San Mateo, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 12/828,145

(22) Filed: Jun. 30, 2010

(65) Prior Publication Data

US 2011/0243153 A1    Oct. 6, 2011

Related U.S. Application Data

(60) Provisional application No. 61/341,581, filed on Mar. 31, 2010.

(51) Int. Cl.
*H04L 12/28* (2006.01)

(52) U.S. Cl.
USPC .......................................... 370/254; 370/401

(58) Field of Classification Search
USPC ......... 370/229–235, 249–255, 395.2–395.41, 370/401, 468
See application file for complete search history.

(56) References Cited

U.S. PATENT DOCUMENTS

| | | | |
|---|---|---|---|
| 7,203,169 B1* | 4/2007 | Okholm et al. | 370/232 |
| 8,108,494 B1* | 1/2012 | Holland et al. | 709/220 |
| 2008/0225707 A1* | 9/2008 | Lange | 370/230 |
| 2008/0225708 A1* | 9/2008 | Lange | 370/230 |
| 2008/0225709 A1* | 9/2008 | Lange | 370/230 |
| 2008/0225712 A1* | 9/2008 | Lange | 370/230.1 |

* cited by examiner

*Primary Examiner* — Hong Cho
(74) *Attorney, Agent, or Firm* — Sughrue Mion, PLLC

(57) ABSTRACT

Systems and methods for network communications bandwidth management and in particular to unified bandwidth manager that interfaces with and hierarchically manages a plurality of service-specific bandwidth reservation and session management systems. By utilizing a novel bandwidth management system, a better purpose specific bandwidth reservation system may thereby be achieved.

22 Claims, 12 Drawing Sheets

NETWORK COMMUNICATIONS BANDWIDTH MANAGER CONTROL SYSTEM PROVIDING FOR ASSOCIATED COMMUNICATIONS PROCESSING RESOURCES

CROSS REFERENCE TO RELATED APPLICATION

This regular U.S. patent application is based on and claims the benefit of priority under 35 U.S.C. 119 from provisional U.S. patent application No. 61/341,581, filed on Mar. 31, 2010, the entire disclosure of which is incorporated by reference herein.

BACKGROUND OF THE INVENTION

1. Field of the Invention

The disclosed embodiments relate generally to network communications bandwidth management and in particular to unified bandwidth manager that interfaces with and hierarchically manages a plurality of service-specific bandwidth reservation and session management systems.

2. Description of the Related Art

Over many years there has been a number of communication services designed to operate over the internet and other networks, each with special performance requirements for their networked communications. These requirements may include near-real-time delivery, streaming, bandwidth volumes, and so on. Often, these attributes motivate the use of special network protocols and/or bandwidth reservation systems. Such bandwidth reservation systems generally provide the following capabilities:

Protect the amount of bandwidth reserved on the network for real-time and near-real-time communications. In essence, the system takes steps to ensure that the amount of bandwidth required for a call or session is available for the duration of that session to ensure a high quality-of-experience to the end user.

Constrain the amount of bandwidth available for real-time or near-real-time communications to make sure that those communications do not interfere with other traffic on the network. For example, users making video calls shouldn't cause SAP to come to a grinding halt or stop Citrix applications from working.

Police access to available bandwidth by integrating with the signaling infrastructure and implementing strategies for dealing with bandwidth shortage at call setup time.

In many cases, a given bandwidth reservation system pertains only to a particular communication service, or only to a particular communications application, or only to a particular manufacturer's application product line, or even only to a particular manufacturer's application. As a result, there is a proliferation of purpose-specific bandwidth reservation systems being sold by manufacturers and being installed in enterprise networks. For convenience, each such purpose-specific bandwidth reservation system and its associated communications application(s) as a "communications silo." Typical commercial communications silos are directed at services such as IP-telephony (also known as Voice over Internet Protocol or VoIP") and video conferencing. The communications silo concept also naturally extends to real-time streaming audio and streaming video enterprise or internet webcast sessions, as well as to playback of recorded streaming audio and streaming video. The communications silo concept can also be adapted to other types of web servers, although in cases wide variations in packet traffic can require additional consideration.

U.S. pending patent application Ser. No. 12/198,085 teaches, among other things, exemplary systems and methods for a Unified Bandwidth Manager for monitoring and for controlling the affairs of a plurality of such bandwidth allocation communications silos. The control capabilities taught include human-operator control, assistance to human-operator control, and automatic control.

SUMMARY OF THE INVENTION

In one aspect of the present invention, a system for bandwidth management in a communication network, where the communication network has a plurality of network conditions and connections with a plurality of service-specific bandwidth managers, may include a high-level bandwidth manager including a control system, and an interface for providing at least one of policy information and goal information to the control system; a control interface to each of the service-specific bandwidth managers, each control interface providing an ability for the high-level bandwidth manager to control at least one aspect of the associated service-specific bandwidth managers, each service-specific bandwidth managers affecting at least one associated network condition; at least one observation reporting element associated with each of the service-specific bandwidth managers, each observation reporting element providing associated ongoing observation information to the high-level bandwidth manager, associated ongoing observation information responsive to at least one network condition affected by the associated service-specific bandwidth manager, and at least one network communications processing resource. The control system may be provided with a plurality of feedback inputs that are responsive to associated ongoing observation information from each of the associated observation reporting elements. The control system may also use the plurality of feedback inputs, together with the at least one policy information and goal information, to produce at least one element of outgoing control information. The at least one element of outgoing control information may be conveyed to at least one of the service-specific bandwidth managers using the associated control interface.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The aforementioned aspects of the invention as well as additional aspects will be more clearly understood as a result of the following detailed description of the various embodiments of the invention when taken in conjunction with the drawings. Specifically.

DETAILED DESCRIPTION

In the following description, reference is made to the accompanying drawing figures which form a part hereof, and which show by way of illustration specific embodiments of the invention. It is to be understood by those of ordinary skill in this technological field that other embodiments may be utilized, and structural, software, electrical, architectural, as well as procedural changes may be made without departing from the scope of the present invention.

The present patent application is directed to expanding at least two capabilities, namely assistance to human-operator control, and automatic control.

The present patent application is also directed to provide for associated "network communications processing" resources such as (but not limited to): Protocol translating gateways (for example H.323/SIP gateways such as those taught in pending U.S. patent application Ser. No. 12/572, 226), Signal transcoder Banks (for example H.263/Flash, H.263/Quicktime, etc), Network firewalls, Conference bridges (a.k.a. "MCUs"), and Media stream encryption engines.

Additionally, the systems and methods may be extended to other types of server-based assets such as those residing on (but not limited to): Video storage servers, Media processing servers, Interactive map and GIS servers and Network-hosted application servers.

Again, each of lists provided above, along with associate remarks, are strictly exemplary and are not to be taken as limiting.

Figure 1A:
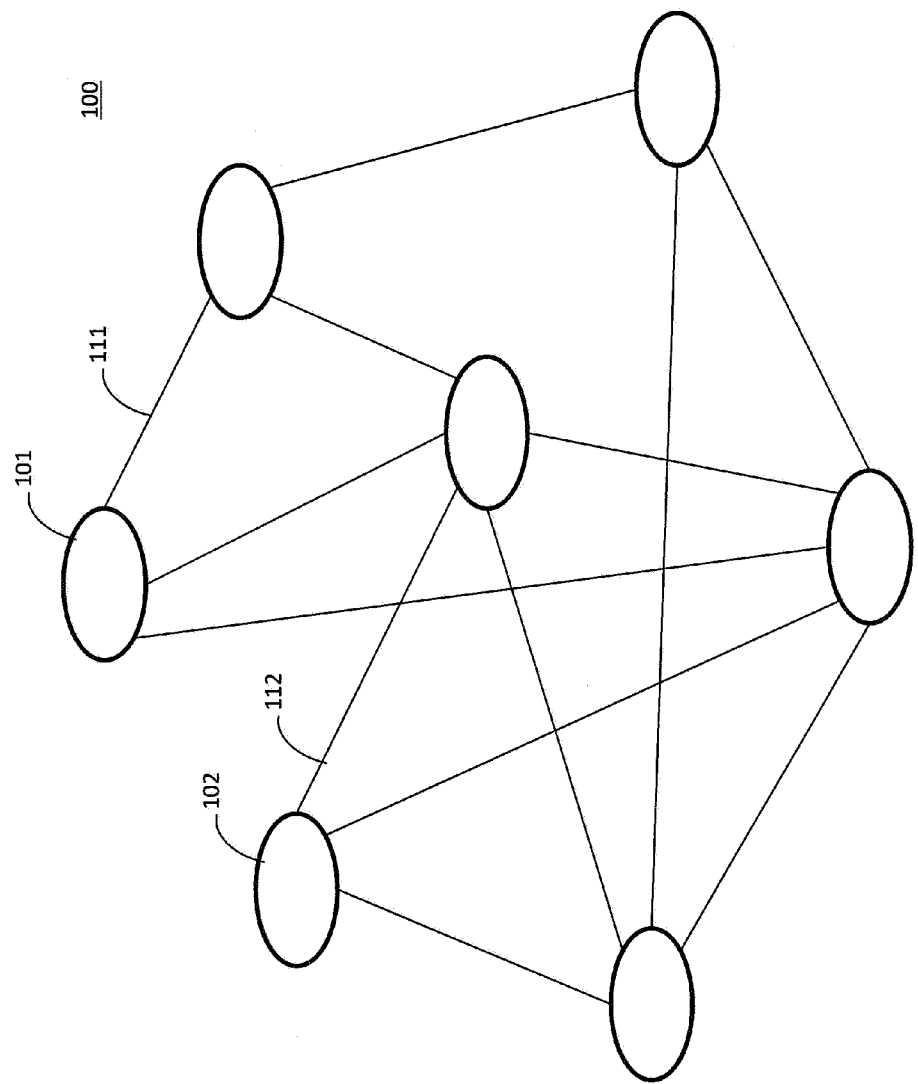
FIG. 1a depicts an exemplary representation of an exemplary an enterprise networking environment.

FIG. 1a depicts an exemplary representation of an exemplary an enterprise networking environment 100 comprising a plurality of network nodes (such as 101, 102, and others depicted) interconnected by a plurality of network links (such as 111, 112, and others depicted). The depiction is abstract in the since that the nodes may be individual routers within a Local Area Network (LAN), floors in a building, buildings on a campus, enterprise sites in a wide area network, etc.

Figure 1B:
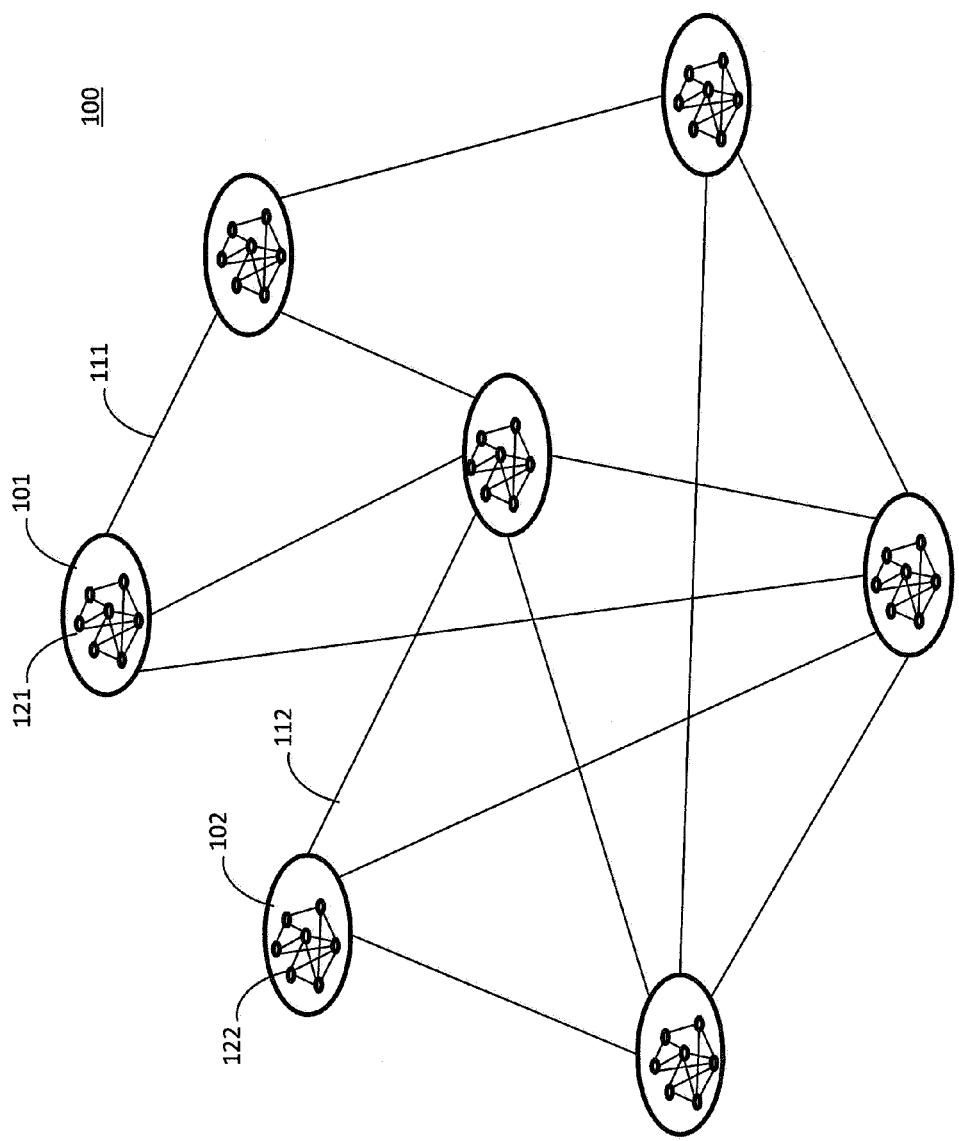
FIG. 1b depicts exemplary additional hierarchical detail of the exemplary enterprise networking environment of FIG. 1a wherein the nodes internally comprise component networks such as LANs.

For cases of wherein the depiction of FIG. 1a represents more than routers within a LAN, FIG. 1b depicts exemplary additional hierarchical detail of the exemplary enterprise networking environment of FIG. 1a wherein the nodes internally comprise component networks such as LANs, building internal networks, campus internal networks, regional networks, etc. (such as 121, 122, and others depicted).

Over time a number of communication services have been designed to operate over the internet and other networks, each with special performance requirements for their networked communications. These special performance requirements may include, for example, near-real-time delivery, streaming, bandwidth volume guarantees, etc. Often, these attributes motivate the use of special network protocols and/or bandwidth reservation systems. Such bandwidth reservation systems generally provide the following capabilities:

Protect the amount of bandwidth reserved on the network for real-time and near-real-time communications. In essence, the system takes steps to ensure that the amount of bandwidth required for a call or session is available for the duration of that session to ensure a high quality-of-experience to the end user.

Constrain the amount of bandwidth available for real-time or near-real-time communications to make sure that those communications do not interfere with other traffic on the network. For example, users making video calls shouldn't cause SAP to come to a grinding halt or stop Citrix applications from working.

Police access to available bandwidth by integrating with the signaling infrastructure and implementing strategies for dealing with bandwidth shortage at call setup time.

In many cases, a given bandwidth reservation system pertains only to a particular communication service, or only to a particular communications application, or only to a particular manufacturer's application product line, or even only to a particular manufacturer's application. As a result, there is a proliferation of purpose-specific bandwidth reservation systems being sold by manufacturers and being installed in enterprise networks. For convenience, each such purpose-specific bandwidth reservation system and its associated communications application(s) as a "communications silo." Typical commercial communications silos are directed at services such as IP-telephony (also known as Voice over Internet Protocol or VoIP") and video conferencing. The communications silo concept also naturally extends to real-time streaming audio and streaming video enterprise or internet webcast sessions, as well as to playback of recorded streaming audio and streaming video. The communications silo concept can also be adapted to other types of web servers, although in cases wide variations in packet traffic can require additional consideration.

Figure 2:
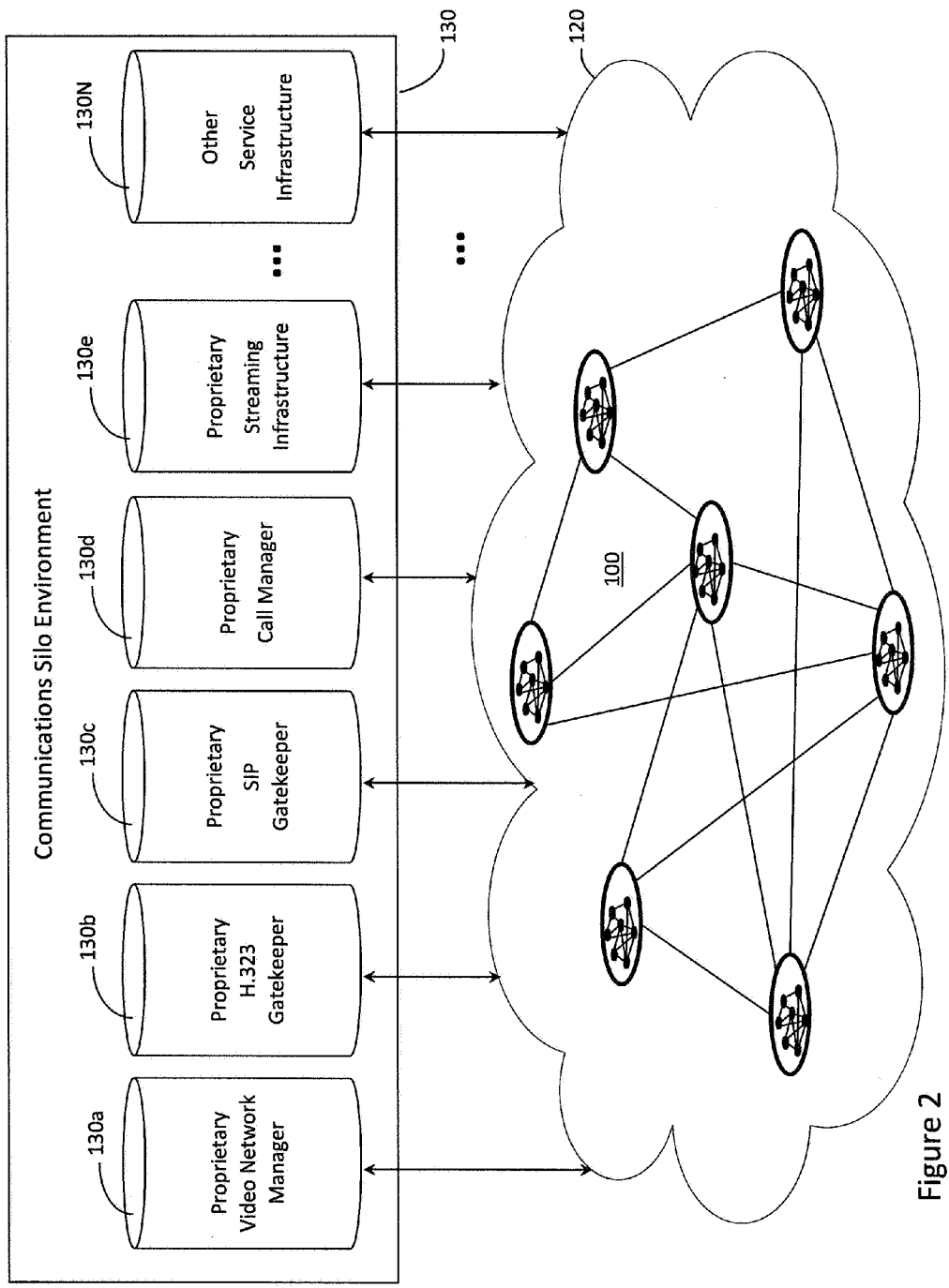
FIG. 2 depicts an exemplary block diagram of an enterprise networking environment 100 including a representation of an exemplary enterprise communication network 120 and a Communications Silos Environment comprising a plurality of communication silos 130a-130n, each pertaining to a separate service-specific bandwidth reservation system.

FIG. 2 depicts an exemplary block diagram of the enterprise networking environment 120 including a representation of an exemplary enterprise communication network 100 and a Communications Silos Environment 130 comprising a plurality of communication silos 130a, 130b, 130c, . . . , 130N, each communication silo associated with and/or pertaining to at least one separate service-specific bandwidth reservation system. The enterprise networking environment 120 may also include one or more of VPNs, Intranets, the Internet, Extranets, and so on. The real-time IP packet traffic may include VoIP, video conferencing, video streaming, e-mail, Internet, internal applications, and so on.

In an embodiment provided for by the invention, each communication silo is uniquely associated with and/or pertains to a separate service-specific bandwidth reservation system. In another embodiment provided for by the invention, at least one of the communication silos is associated with and/or pertains to more than one separate service-specific bandwidth reservation system. In another embodiment provided for by the invention, at least two of the communication silos are associated with and/or pertain to more the same service-specific bandwidth reservation system (for example, as may be advantageous in server and/or network load balancing, security structuring, vendor environment segregation, product-vintage version segregation, etc.).

In contemporary product offerings and known proposed systems, each such bandwidth reservation system carves out a dedicated portion of the overall network bandwidth available in the enterprise for exclusive use by one or more applications. That is, by definition adopted above, each bandwidth reservation system is provided with a dedicated pool of enterprise network bandwidth for the exclusive use of a service associated with that particular bandwidth reservation system. In applications where session admission control is used, rather than call admission, the internal details and sharing effects may differ but for the sake of illustration a session admission system can be viewed in this model as a communications silo (such as 130a, 130b, 130c, ..., 130N.) comprising a bandwidth reservation system.

In practice, commercial bandwidth reservation system products and there foreseen progeny are largely "black boxes" providing one or more of varied levels, types, and forms of controls, internal control systems, information, and internal dynamics. In particular, the internal control systems and internal dynamics will typically not be known.

Figure 3:
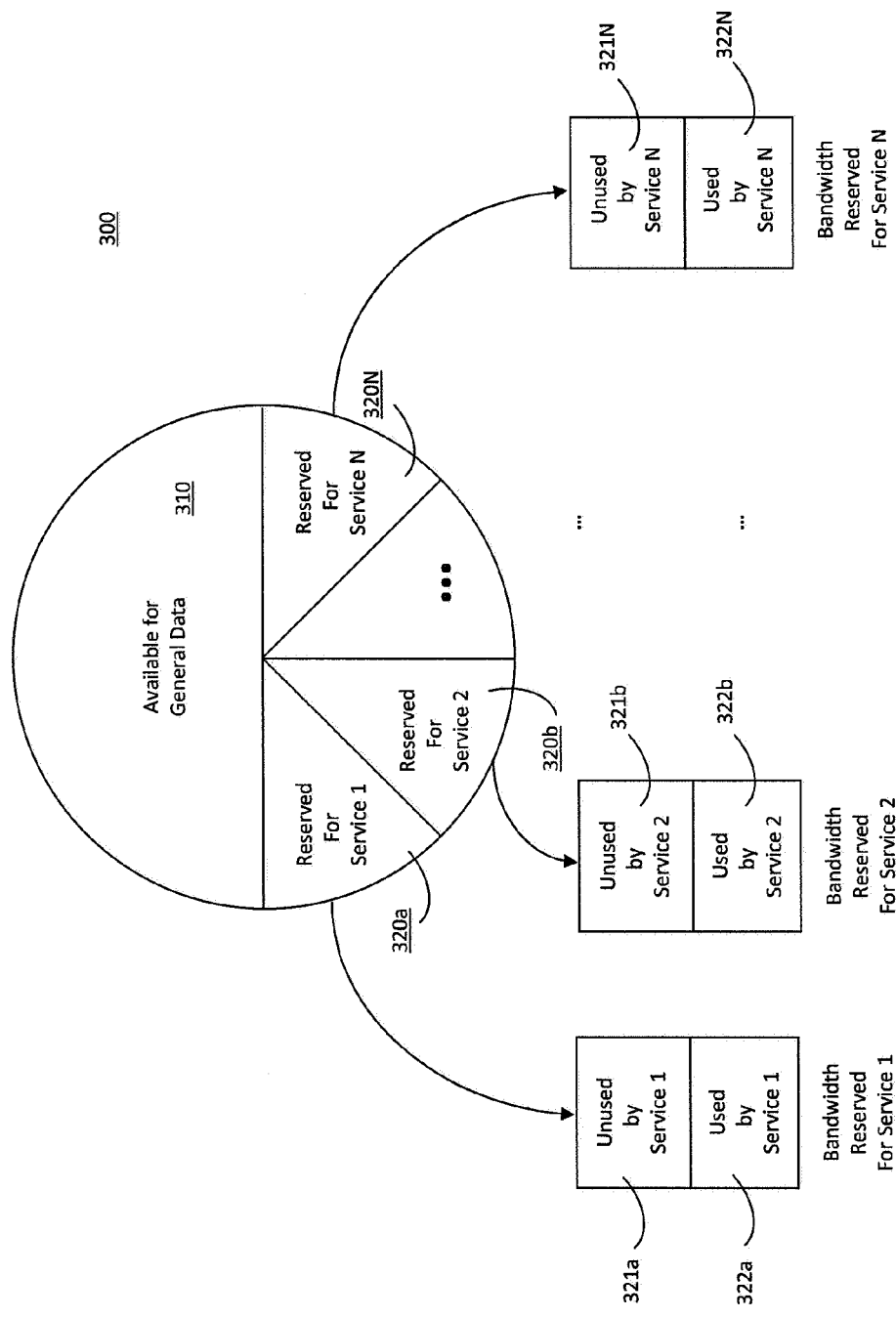
FIG. 3 shows a "pie chart" representation depicting of how, at any particular moment in time, each of the bandwidth slices internally comprises both used bandwidth and unused bandwidth.

The upper portion of FIG. 3 provides a "pie chart" 300 view representing how enterprise network bandwidth is carved up among some number of these services, the number here represented as the variable "N." Each slice 320a, 320b, 320c, ..., 320N of the pie 300 associated with these services (Service 1, Service 2, .... Service N) represents a portion of bandwidth reserved for the labeled service, i.e., reserved for the exclusive use of each associated bandwidth reservation system to allocate to calls or sessions. The remaining enterprise network bandwidth 310 remains available for general purpose use, outside the scope and reach of the communications silos 130a, 130b, 130c, ..., 130N and their associated services. As a result, its bandwidth is not used by these N services.

The lower portion of FIG. 3 shows a "pie chart" view 300 of how, at any particular moment in time, each of the bandwidth slices 320a, 320b, 320c, ..., 320N internally comprises both unused bandwidth 321a, 321b, 321c, ..., 321N and used bandwidth 322a, 322b, 322c, ..., 322N. As any of this unused bandwidth 321a, 321b, 321c, ..., 321N is not made available for other services, it is effectively wasted. Should the demand for a particular service exceed the total amount carved out for that service, any further requests for that service must be denied. This is the case even if there is unused bandwidth 321a, 321b, 321c, ..., 321N in the isolated bandwidth pools of other communications silos 130a, 130b, 130c, ..., 130N.

Figure 4:
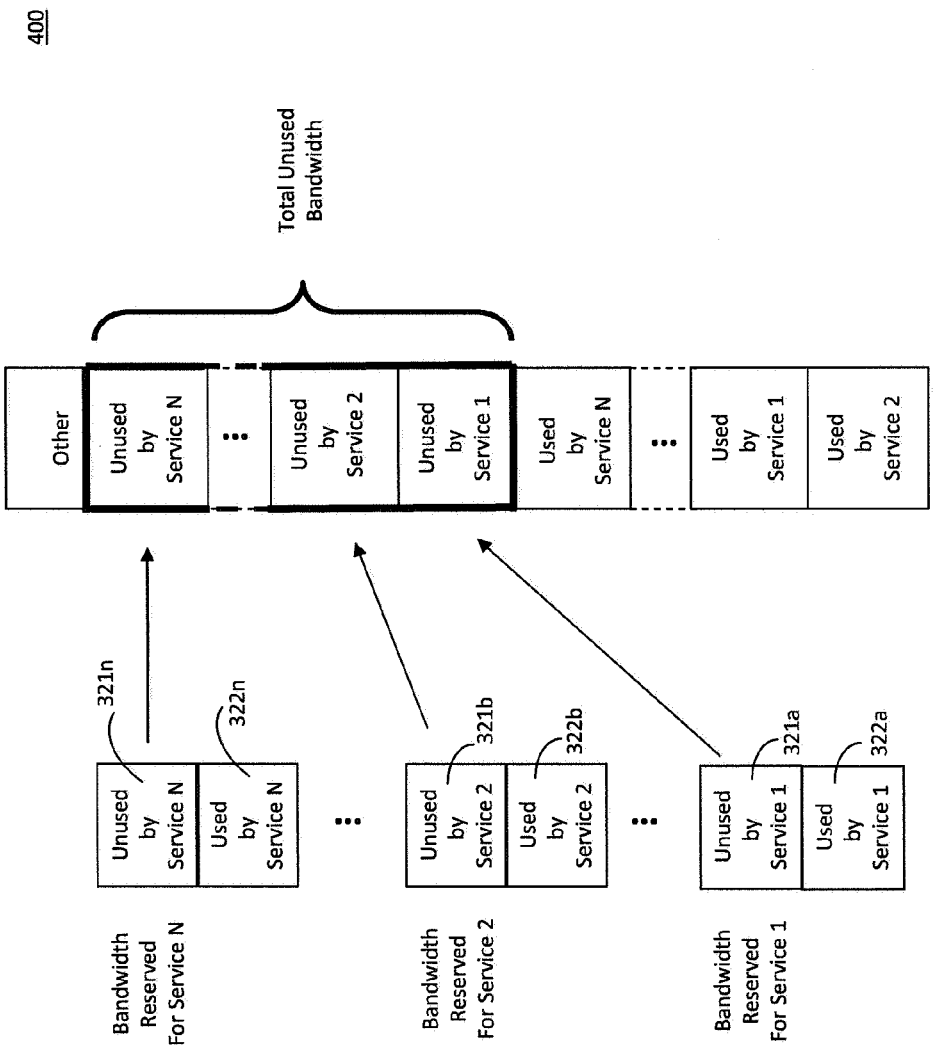
FIG. 4 shows a macro-scale view showing all unused bandwidth being aggregated contiguously.

FIG. 4 shows a macro-scale view 400 showing all unused bandwidth 321a, 321b, 321c, ..., 321N on the left side as in FIG. 3 and on the right side reorganized so as to be contiguously aggregated. If there are a large number of services, or inappropriate sizes in the carve-outs for each service, there can be tremendous wastes of bandwidth. On the other hand, if the carve-outs for each particular service are not large enough, that service could suffer a high frequency of request rejections and denial of service. In fact, classic properties of blocking-policy resource allocation systems and methods confirm worse-case fears—with fixed bandwidth partitions and partitions of service requests, there is less efficiency and steep trade-offs between the amount of wasted bandwidth required to be kept in reserve versus the increases in blocking of service requests.

Figure 5:
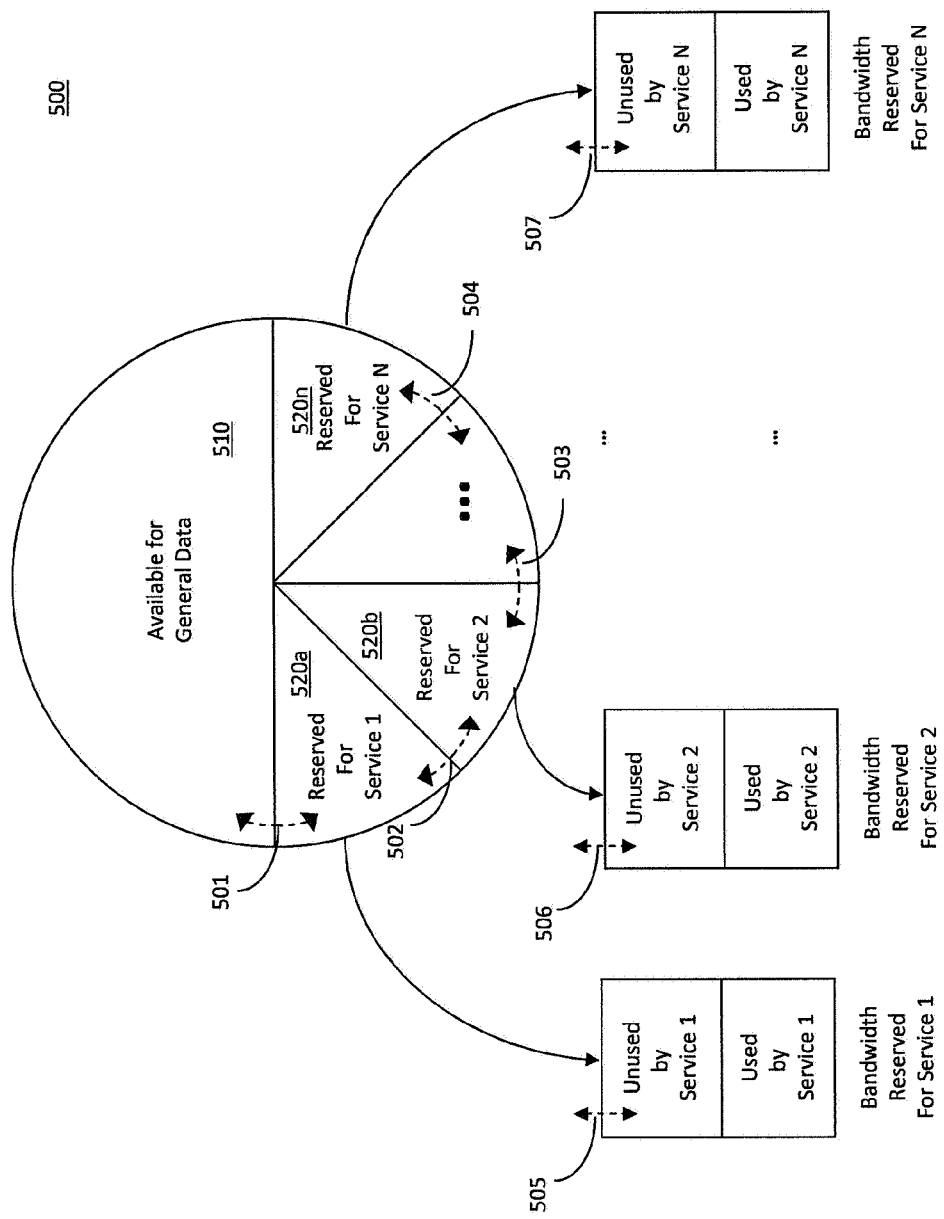
FIG. 5 shows a "pie chart" view of how bandwidth allocation can be adjusted.

FIG. 5 depicts a recasting of the 'fixed-boundary' "pie chart" view 300 of FIG. 3 as a variable boundary' "pie chart" view 500 wherein bandwidth allocation for each service can be dynamically adjusted as suggested by the dashed arrowed lines 501-507. These dynamic adjustments may be determined or controlled by higher level policies, human operation, automatic hierarchical control systems, etc.

U.S. pending patent application Ser. No. 12/198,085 teaches systems and methods for such arrangements. More specifically, U.S. pending patent application Ser. No. 12/198,085 teaches, among other things, exemplary systems and methods for a Unified Bandwidth Manager for monitoring and for controlling the affairs of a plurality of such bandwidth allocation communications silos. The control capabilities taught include: human-operator control, assistance to human-operator control, and automatic control.

The above list and remarks are only exemplary and not to be taken as limiting.

The Unified Bandwidth Manager, or "Meta-Gatekeeper," taught U.S. pending patent application Ser. No. 12/198,085 teaches a wide number of ways in which dynamical adjustment of the size of individual bandwidth allocations, as suggested by the dashed arrowed lines 501-507 in FIG. 5, can be made to each of the bandwidth reservation systems. In an embodiment provided for by the invention, the Unified Bandwidth Manager provides a unified management infrastructure for all enterprise IP network real-time communications (such as VoIP and video conferencing).

In an embodiment provided for by the invention, the Unified Bandwidth Manager is capable of spanning enterprise-wide IP communications.

Figure 6:
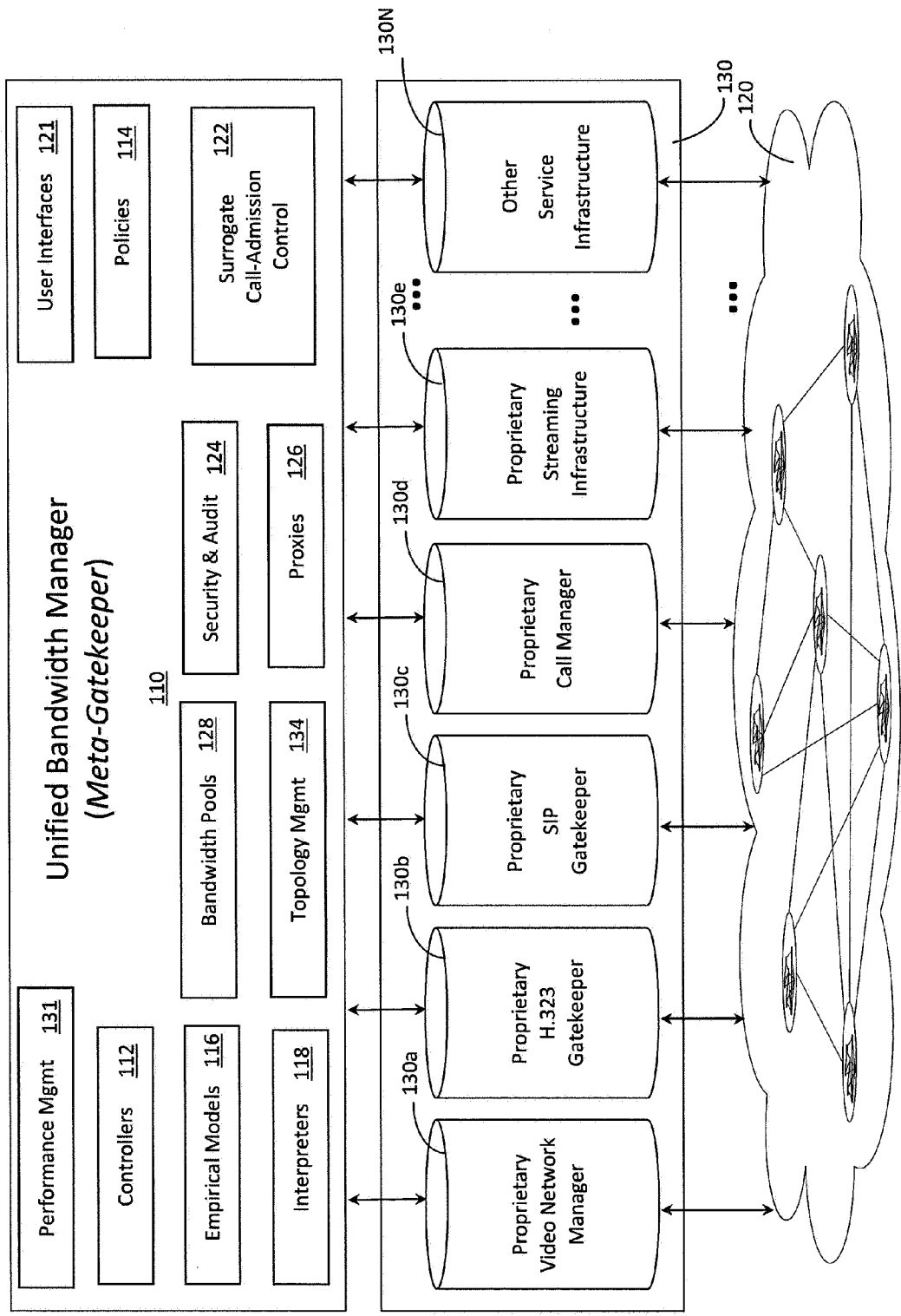
FIG. 6 depicts an exemplary high-level view of an exemplary Unified Bandwidth Manager for controlling the maximum settings of each of the bandwidth reservation systems as provided for and as expanded by the present invention.

FIG. 6 depicts an exemplary representation of exemplary embodiments of the Unified Bandwidth Manager as taught in U.S. pending patent application Ser. No. 12/198,085 and as both provided for by the present invention and to be expanded by the present invention. More specifically, FIG. 6 depicts an exemplary high-level view of an exemplary Unified Bandwidth Manager for controlling the maximum settings of each of the bandwidth reservation systems as provided for and as expanded by the present invention. In the depiction of FIG. 6, exemplary embodiments of the Unified Bandwidth Manager 110 interact with the plurality of bandwidth reservation systems included in the plurality of communication silos 130a, 130b, 130c, ..., 130N. Exemplary embodiments of the Unified Bandwidth Manager 110 can provide, for example, unified bandwidth management functions that include call admission control functionality for all real-time traffic on enterprise networking environment 120, which can include VPNs, Intranets, the Internet, Extranets, and so on. The real-time IP packet traffic may include VoIP, video conferencing, video streaming, e-mail, internet, internal applications, and so on. Exemplary embodiments of the Unified Bandwidth Manager 110 can also interact with associated network resources relating to other applications.

Exemplary embodiments of the Unified Bandwidth Manager 110 provides an integration layer atop a plurality of real-time communications technologies—more specifically atop a plurality of bandwidth reservation systems. Depending upon implementation details and available information flows, such an integration layer makes possible a number of functions and features in the areas of administration, bandwidth management, and cost reductions.

Exemplary embodiments of the Unified Bandwidth Manager 110 interface with various outside gatekeeper, manager, and proxy server products and standards. These include, but are not limited to, communications systems built on SIP, H.323 gatekeepers for voice and/or video, VoIP call managers, and Content Delivery Networks.

Exemplary embodiments of the Unified Bandwidth Manager 110 also provides a common network topology model and associated bandwidth pools, a single interface for administrators to describe their networks, a single interface for administrators to manage real-time communications, and a single interface for deeply-embedded QoS infrastructure.

Greater exemplary detail of various exemplary features and exemplary embodiments of the Unified Bandwidth Manager 110 are provided in pending U.S. patent application Ser. No. 12/572,226. Although the control system described in pending U.S. patent application Ser. No. 12/572,226 will be considered shortly, attention is first directed to a simpler abstract representation of the arrangement of FIG. 6, and then to new the present invention.

Figure 7A:
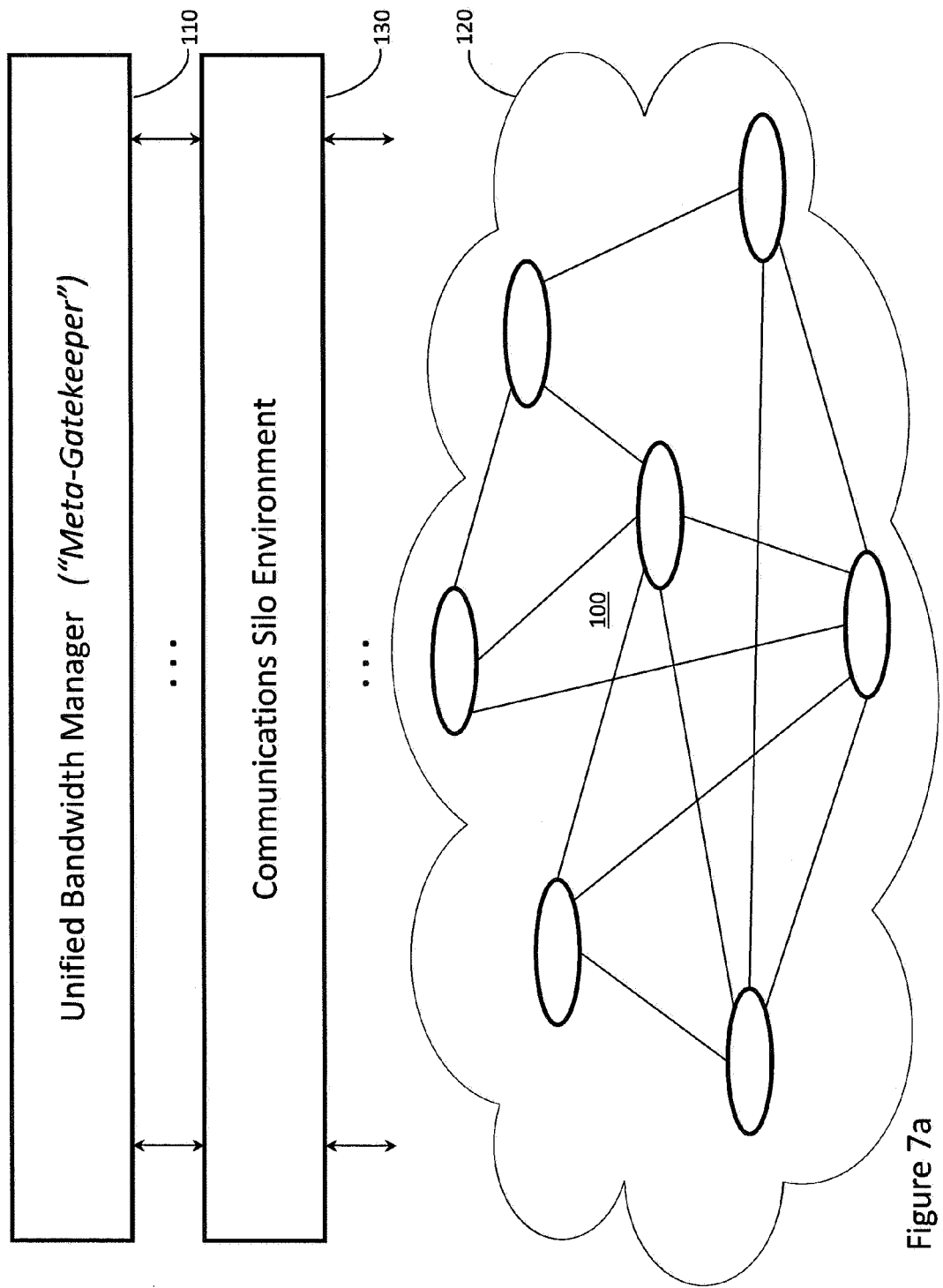
FIG. 7a depicts a first level of abstraction of arrangements such as that depicted in FIG. 6.
Figure 7B:
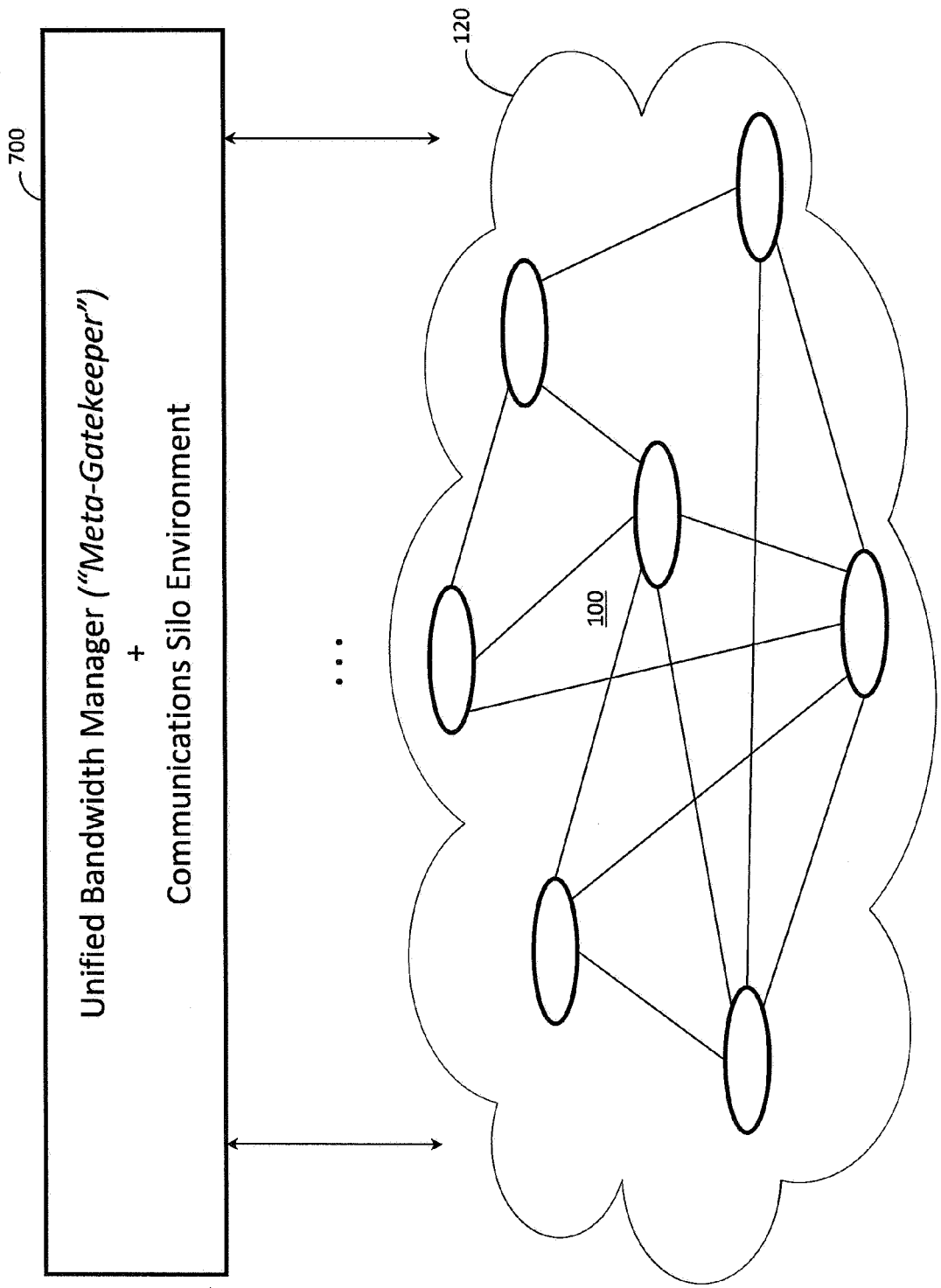
FIG. 7b depicts a higher level of abstraction of arrangements such as that depicted in FIG. 6 wherein the Unified Bandwidth Manager and Communications Silo Environment are aggregated as a single controlling entity.

FIG. 7a depicts a first level of abstraction of arrangements such as that depicted in FIG. 6. At this level of abstraction, exemplary internal features, structures, etc. are suppressed. FIG. 7b depicts a higher level of abstraction of arrangements such as that depicted in FIG. 6 wherein the Unified Bandwidth Manager and Communications Silo Environment are aggregated as a single controlling entity 700.

In addition to network bandwidth allocations, many contemporary network-based computer and communications services, applications, and capabilities also involve the associated allocation of various types of communications processing resources such as (but not limited to): Protocol translating gateways (for example H.323/SIP gateways such as those taught in pending U.S. patent application Ser. No. 12/572,226), Signal transcoder Banks (for example H.263/Flash, H.263/Quicktime, etc.), Network firewalls, Conference bridges (a.k.a. "MCUs"), and Media stream encryption engines.

Other types of server-based assets are also possible, such as those residing on (but not limited to): Video storage servers, Media processing servers, Interactive map and GIS servers, and Network-hosted application servers.

Using the simplified abstracted representation of FIG. 7b as the point of departure, the present invention is directed to expanding at least two capabilities of the control environment provided by the exemplary Unified Bandwidth Manager features and embodiments taught in pending U.S. patent application Ser. No. 12/572,226, namely assistance to human-operator control, and automatic control.

Within these the present invention provides for the inclusion of associated "network communications processing" resources such as (but not limited to): Protocol translating gateways (for example H.323/SIP gateways such as those taught in pending U.S. patent application Ser. No. 12/572, 226), Signal transcoder banks (for example H.263/Flash, H.263/Quicktime, etc.), Network firewalls, Conference bridges (a.k.a. "MCUs"), and Media stream encryption engines.

Additionally, the systems and methods may be extended to other types of server-based assets such as those residing on (but not limited to): Video storage servers, Media processing servers, Interactive map and GIS servers, and Network-hosted application servers.

Again, each of the lists and associate remarks provided above are merely exemplary and are not to be taken as limiting.

Figure 8:
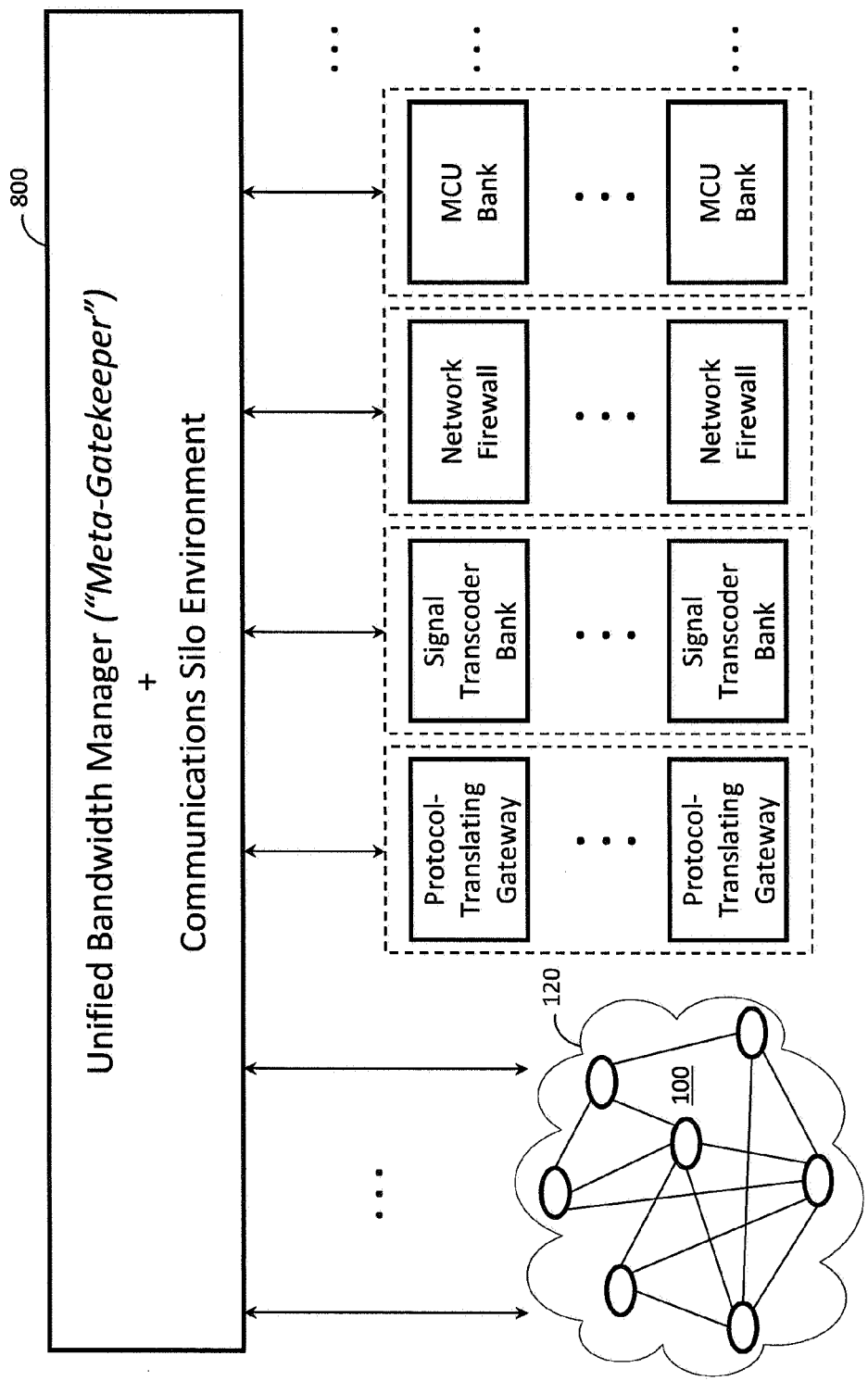
FIG. 8 depicts an exemplary arrangement augmenting the exemplary arrangement depicted in FIG. 7b in an exemplary manner provided for by the invention.

FIG. 8 depicts an exemplary arrangement augmenting the exemplary arrangement depicted in FIG. 7b in an exemplary manner provided for by the invention. In this exemplary arrangement, servers or other configurations provide for instances of: Protocol translating gateways sessions, Signal transcoder sessions, Network firewall traversal sessions, and Conference bridges (a.k.a. "MCUs") sessions.

The depicted collection of gateways, banks, firewalls, etc. is merely exemplary—any of the above may be omitted or replaced with other types of network communications processing resources and/or server-based assets, for example (but not limited to): Media stream encryption sessions, Video storage server sessions, Media processing server sessions, Interactive map server sessions and GIS server sessions, and Network-hosted application server sessions.

Additionally, the depicted collection need not have pluralities of gateways, banks, firewalls, etc., but may have one instance, that instance capable of providing a plurality of sessions.

A contemporary network-based computer and communications service, application, or capability may request or require bandwidth allocations and additionally at least one associated allocation of a communications processing resource such as those listed above.

The invention provides for at least some of these allocations to be directly or indirectly controlled by an expanded version 800 of the combined Unified Bandwidth Manager and Communications Silo Environment entity 700 of FIG. 7b.

Figure 9:
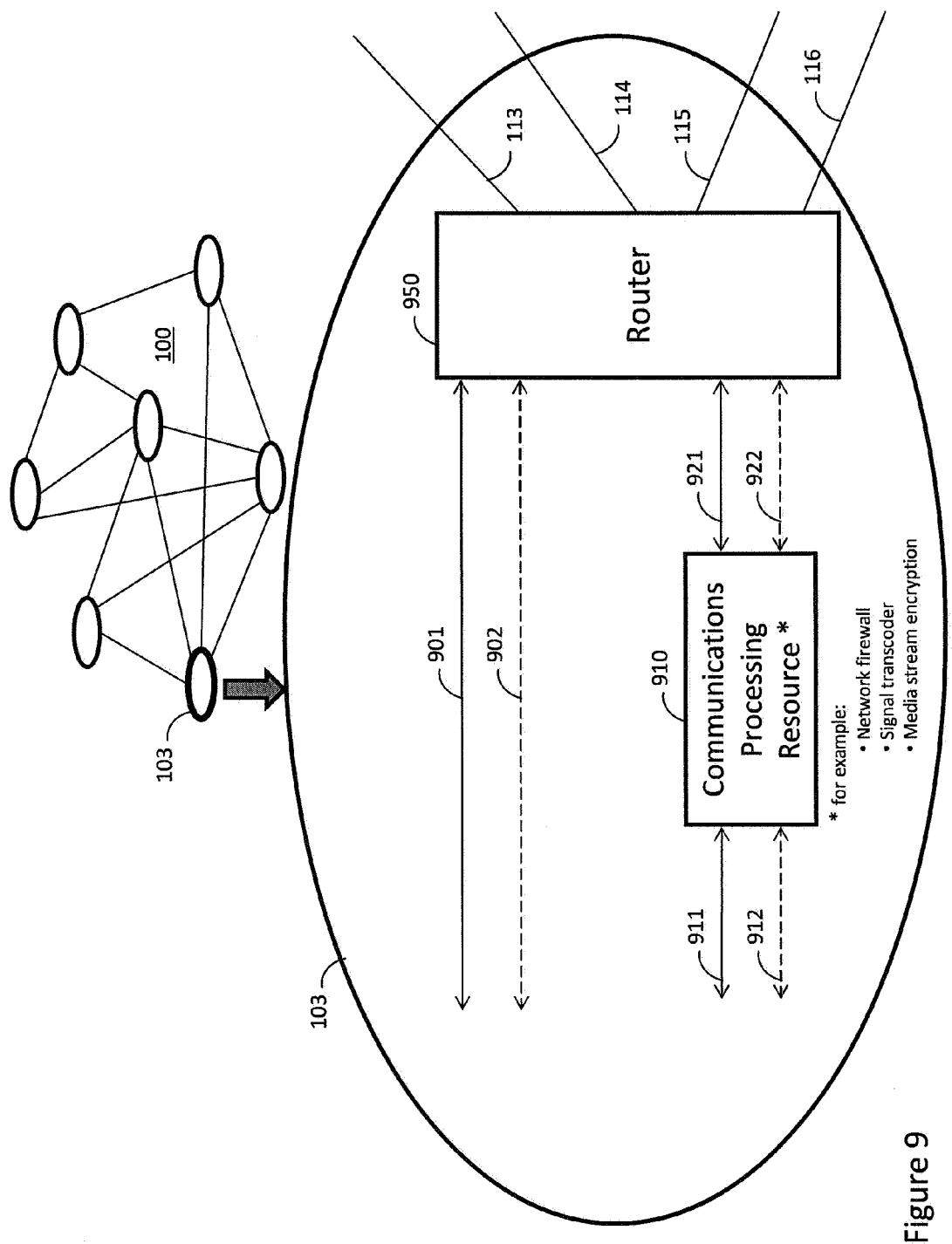
FIG. 9 depicts an example where an exemplary node within an exemplary enterprise communications network comprises a router linking network data flows inside the node with network data flows outside the node.

FIG. 9 depicts an example where an exemplary node 103 within an exemplary enterprise communications network 100 comprises a router 950 linking network data flows inside the node (for example 901, 902, 911, 912, 921, 922) with network data flows outside the node (for example 113, 114, 115, 116). In the example of FIG. 9, some network data flows 901, 911, 921 (denoted as solid lines) are under the (direct or indirect) bandwidth allocation control of the combined Unified Bandwidth Manager and Communications Silo Environment entity 800, while other network data flows 902, 912, 922 (denoted as dashed lines) are not under the (direct or indirect) bandwidth allocation control of the combined Unified Bandwidth Manager and Communications Silo Environment entity 800. Of the network data flows 901, 911, 921 under (direct or indirect) bandwidth allocation control by the combined Unified Bandwidth Manager and Communications Silo Environment entity 800, some 901 transact directly with the router as inherent, as option, as fall-back, etc. in the a given first individual or first collection of network-based computer and communications service(s), application(s), or capability (ies). Other network data flows 911 under (direct or indirect) bandwidth allocation control by the combined Unified Bandwidth Manager and Communications Silo Environment entity 800 involve action of a session provided by a communications processing resource 910 before or after the router 950 and have an associated corresponding network flow 921 between the communications processing resource 910 and the router 950. In some situations, implementations, or embodiments provided for by the invention, the communications processing resource 910 additionally may support network flows 912, 922 not under (direct or indirect) bandwidth allocation control by the combined Unified Bandwidth Manager and Communications Silo Environment entity 800. The communications processing resource 910 depicted in FIG. 9 can, for example, provide one or more of a network firewall traversal session, a signal transcoding session, and/or a media stream encryption session, among many other possibilities as suggested above.

For the example considered here, a bandwidth allocation for network flow 901 does not require a session allocation of the communications processing resource 910, but a bandwidth allocation for network flow 911 does require a session allocation of the communications processing resource 910 as well as a bandwidth allocation for the collateral network flow 921. The communications processing resource 910 will provide up to a maximum number of simultaneous sessions. In some cases, the maximum number of simultaneous sessions may be somewhat variable, driven by computational loading for example. More commonly, the maximum number of simultaneous sessions is a fixed value implemented in the software of the communications processing resource 910. For example: A transcoder server may only permit a maximum number of simultaneous VoIP and/or Video transcoding sessions; A network firewall may only permit a maximum number of simultaneous VoIP and/or Video traversal sessions; A media stream encryption server may only permit a maximum number of simultaneous VoIP and/or Video encryption sessions.

Additionally, albeit for different reasons, implementations of a protocol translating gateway may only permit a maximum number of sessions even though such a gateway is not actively handling media flows.

Exemplary Unified Bandwidth Manager features and embodiments taught in pending U.S. patent application Ser. No. 12/572,226 provide for control systems and human operator modeling tools leveraging a multiservice blocking model. Because of the typical statistics of sessions and properties of the associated aggregated request traffic, the aggregated service requests advantageously closely conform to a Poisson arrival process. Session statistic also typically lead to exponential holding times, although this is not strictly required for the resulting stochastic dynamics to behave as a product-form network. The resulting dynamics have the both remarkable property that if system behavior can be structured in such a fashion as to truncate the state-space, the remaining permitted states and state-transitions maintain their relative probability ratios and thus the resulting dynamics only requires calculation of the normalization factor. This normalization factor is calculated by summing all of the relative probabilities assuming any normalization and finding the normalization factor (for example reciprocal of the sum) that cause the sums of all probabilities to equal a value of 1. This can advantageously exploited in the present invention by structuring the allocations of sessions from communications processing resources (such as element 910 in FIG. 9) so as to impose a truncation on the product-form state space in such a way that the probabilities for the permitted states and/or state-transitions can be explicitly algebraically summed and used to solve for the factor needed to normalize the state and/or state-transition probabilities.

As a result, the system and method of the present invention allow for inclusion of associated communications processing resources along with bandwidth allocations.

The system and method of the present invention thus delivers a powerful enhancement to the exemplary Unified Bandwidth Manager features and embodiments taught in pending U.S. patent application Ser. No. 12/572,226.

Additionally, these powerful new features are added by simply "tapping into" the control and modeling framework taught in pending U.S. patent application Ser. No. 12/572,226 with state-space modifications (for example, addition of an additional vector space coordinate) and/or truncations of the product-form state-space and/or state-transitions.

Figure 10:
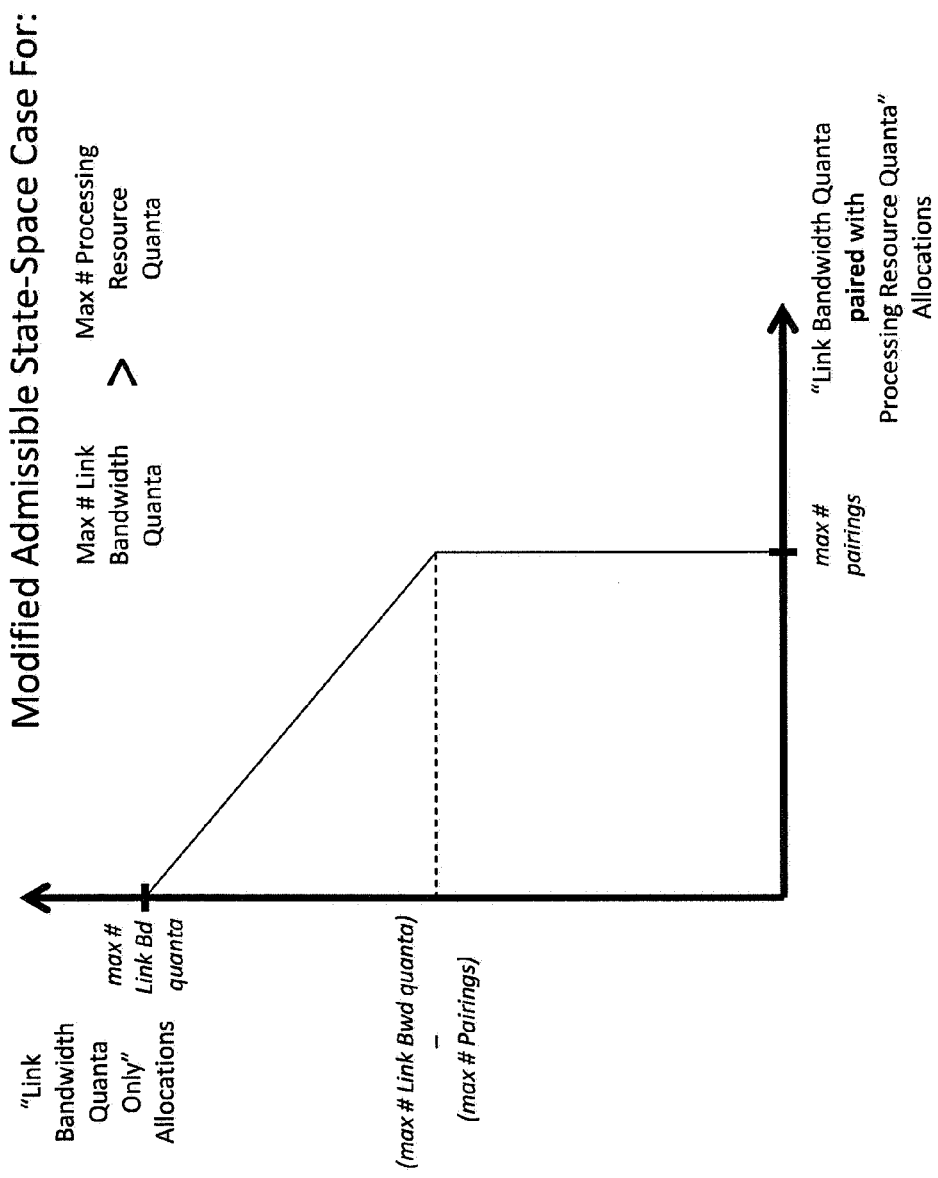
FIG. 10 shows exemplary state-space modifications (which may or may not be necessary, depending on the starting point) and/or truncations of the product-form state-space and/or state-transitions.

FIG. 10 shows exemplary state-space modifications (which may or may not be necessary, depending on the starting point) and/or truncations of the product-form state-space and/or state-transitions.

In this example, the given service, application, etc. (for example, a VoIP call, video call, etc.) is assumed to require an allocation of a uniform-sized "quanta" of bandwidth. This quanta can, for example, be fixed, represent an average, or be a function of an average together with higher statistical moments of underlying packet traffic. Some instances (for example VoIP call, video call) may require a communications processing resource (such as element 910 in FIG. 9) session while others may not. For this particular example, one could pair the session of communications processing resource session with the associated bandwidth allocation. In some situations this may include an added bandwidth element (for example, recognizing the extra bandwidth required by the pair of flows 911 and 921 as compared to the flow 901). FIG. 10 shows a case wherein the maximum number of bandwidth quanta is larger than the number of sessions made available by the communications processing resource. If further, for example, there is only one bandwidth quanta used in each session pairing, one could envision the following example: One bandwidth quanta used in each session pairing, Max of 10 pairings (horizontal state-space axis), and Max of 16 bandwidth quanta.

The state-space truncation is then governed by the following:

If there are no requests for pairings, then all 16 bandwidth quanta are available for non-pairing call allocations.

For each pairing allocated, there is one fewer bandwidth quanta available for non-pairing call allocations.

If all ten pairings are allocated, no more pairings are possible and only 6 bandwidth quanta are available for non-pairing call allocations.

Thus the truncated state space has the shape depicted in FIG. 10. Variations of the assumptions result in associated variations, for example the location of the external vertex, slope of the lines, etc.

Each of the methods described herein may be governed by instructions that are stored in a computer readable storage medium and that are executed by one or more processors of one or more servers or clients. For example, each of the operations may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for bandwidth management in a communications network, the communication network having a plurality of network conditions and including connections with a plurality of service-specific bandwidth managers, the system comprising:

a high-level bandwidth manager including a control system, and an interface for controlling the maximum settings of each of the service-specific bandwidth managers;

an interface to each of the service-specific bandwidth managers, each control interface providing an ability for the high-level bandwidth manager to control at least one aspect of the associated service-specific bandwidth managers, each service-specific bandwidth managers affecting at least one associated network condition the interface further providing for interaction and at least one information flow between the high-level bandwidth manager and each of the service-specific bandwidth managers, and at least one network communications processing resource, wherein the control system is provided with a plurality of feedback inputs that are responsive to associated ongoing observation information from each of the associated observation reporting elements including observation information responsive to allocations of the network communications processing resource;

wherein the control system uses said plurality of feedback inputs, together with the at least one policy information and goal information, to produce at least one element of outgoing control information;

wherein the at least one element of outgoing control information is conveyed to at least one of the service-specific bandwidth managers using the associated interface.

2. The system of claim 1, wherein the at least one network communications processing resource comprises a protocol translating gateway.

3. The system of claim 1, wherein the at least one network communications processing resource comprises a signal transcoder.

4. The system of claim 1, wherein the at least one network communications processing resource comprises a network firewall.

5. The system of claim 1, wherein the at least one network communications processing resource comprises a conference bridge.

6. The system of claim 1, wherein the at least one network communications processing resource comprises a media stream encryption engine.

7. The system of claim 1, wherein the control system utilizes a multi-service stochastic process blocking model.

8. The system of claim 1, wherein an observation reporting element comprises an observation information interface to one service-specific bandwidth manager.

9. The system of claim 8, wherein the observation information interface includes a file.

10. The system of claim 8, wherein the observation information interface includes an API.

11. The system of claim 8, wherein the observation information interface includes a data stream.

12. The system of claim 1, wherein an observation reporting element comprises a network monitor separate from the service-specific bandwidth managers.

13. The system of claim 1, wherein the interface includes a file.

14. The system of claim 1, wherein the interface includes an API.

15. The system of claim 1, wherein the interface includes a data stream.

16. The system of claim 1, wherein at least one of the service-specific bandwidth managers controls the admissions of Voice over IP calls.

17. The system of claim 1, wherein at least one of the service-specific bandwidth managers controls the admissions of video conferencing calls.

18. The system of claim 1, wherein at least one of the service-specific bandwidth managers controls the admissions of at least one of audio streaming sessions and video streaming sessions.

19. The system of claim 1, wherein at least one of the service-specific bandwidth managers controls the bandwidth allowed in admitted calls.

20. The system of claim 1, wherein at least one of the service-specific bandwidth managers controls the admissions of server access sessions.

21. The system of claim 1, wherein at least one of the service-specific bandwidth managers controls the admissions of database transactions.

22. The system of claim 1, wherein at least one of the service-specific bandwidth managers controls the bandwidth allowed in admitted streaming sessions.

* * * * *